US010818267B2

(12) United States Patent
Zhang et al.

(10) Patent No.: US 10,818,267 B2
(45) Date of Patent: Oct. 27, 2020

(54) METHOD FOR DISPLAY CONTROL AND RELATED PRODUCTS

(71) Applicant: Guangdong Oppo Mobile Telecommunications Corp., Ltd., Dongguan, Guangdong (CN)

(72) Inventors: Haiping Zhang, Guangdong (CN); Yibao Zhou, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 45 days.

(21) Appl. No.: 16/182,952

(22) Filed: Nov. 7, 2018

(65) Prior Publication Data

US 2019/0180715 A1 Jun. 13, 2019

(30) Foreign Application Priority Data

Dec. 13, 2017 (CN) .......................... 2017 1 1329772

(51) Int. Cl.
*G09G 3/36* (2006.01)
*G09G 5/00* (2006.01)
(Continued)

(52) U.S. Cl.
CPC ................ *G09G 5/04* (2013.01); *G09G 3/20* (2013.01); *G09G 5/14* (2013.01); *G09G 2310/0232* (2013.01); *G09G 2320/0666* (2013.01); *G09G 2320/0686* (2013.01); *G09G 2360/144* (2013.01); *H04M 1/72519* (2013.01)

(58) Field of Classification Search
CPC .. G09G 5/04; G09G 3/36; G09G 5/00; G09G 5/10; G06F 3/038
See application file for complete search history.

(56) References Cited

U.S. PATENT DOCUMENTS

2004/0110526 A1   6/2004  Volland
2006/0268003 A1*  11/2006  Tanase ................. G09G 3/2003
                                                        345/603
(Continued)

FOREIGN PATENT DOCUMENTS

CN    1423886 A    6/2003
CN    103745687 A  4/2014
(Continued)

OTHER PUBLICATIONS

International search report issued in corresponding international application No. PCT/CN2018/113773 dated Feb. 11, 2019.
(Continued)

*Primary Examiner* — Pegeman Karimi

(57) ABSTRACT

A method for display control and related products are provided. The method for display control is applicable to an electronic device including a notched screen and a circuit coupled with the notched screen. The notched screen has a first region and a second region. The method includes the following. Device color information near the first region is acquired. A target color-display adjustment parameter of the first region is determined according to the device color information. Display of the first region is controlled according to the target color-display adjustment parameter.

14 Claims, 7 Drawing Sheets

(51) Int. Cl.
*G09G 5/04* (2006.01)
*G09G 3/20* (2006.01)
*G09G 5/14* (2006.01)
*H04M 1/725* (2006.01)

(56) References Cited

U.S. PATENT DOCUMENTS

| | | | |
|---|---|---|---|
| 2014/0204127 A1 | 7/2014 | Tann et al. | |
| 2015/0054864 A1* | 2/2015 | Choi | G09G 3/2003 345/694 |
| 2016/0343777 A1 | 11/2016 | Hirakata et al. | |
| 2017/0160603 A1 | 6/2017 | Zhang et al. | |
| 2017/0162111 A1* | 6/2017 | Kang | H01L 27/326 |
| 2019/0073941 A1* | 3/2019 | Xi | G09G 3/2003 |
| 2019/0250793 A1* | 8/2019 | Choi | G06F 3/04817 |

FOREIGN PATENT DOCUMENTS

| | | |
|---|---|---|
| CN | 105068838 A | 11/2015 |
| CN | 107015308 A | 8/2017 |
| CN | 107123388 A | 9/2017 |
| CN | 107172288 A | 9/2017 |
| CN | 107342036 A | 11/2017 |
| CN | 107342037 A | 11/2017 |
| CN | 107346650 A | 11/2017 |
| CN | 107390422 A | 11/2017 |

OTHER PUBLICATIONS

Joe Rossignol, iPhone X Notch: Everything You Need to Know—MacRumors, Sep. 14, 2017, the whole document.
Charlie Sorrel, Notcho app hides iPhone X's fugly notch Cult of Mac, Nov. 10, 2017, the whole document.
Unbox Therapy, Removing the Notch From iPhone X, Nov. 13, 2017, the whole document.
Extended European search report issued in corresponding European application No. 18206902.1 dated Apr. 23, 2019.
English translation of the Second Office Action issued in corresponding CN application No. 201711329772.X dated Aug. 12, 2020.

* cited by examiner

METHOD FOR DISPLAY CONTROL AND RELATED PRODUCTS

CROSS-REFERENCE TO RELATED APPLICATION(S)

This application claims priority to Chinese Patent Application No. 201711329772.X, filed on Dec. 13, 2017, the content of which is hereby incorporated by reference in its entirety.

TECHNICAL FIELD

The present disclosure relates to the field of electronic devices, and particularly relates to a method for display control and related products.

BACKGROUND

With the popularization of electronic devices (mobile phones, tablet PCs, etc.), the electronic devices can support more and more applications and become more powerful. The electronic devices develop towards diversification and individuation, and become essential electronic products in users' lives.

At present, special-shaped screens (such as, notched display screens) have received more and more attention from the users. However, the special-shaped screens, unlike mainstream rectangular screens, present profiled structures, thus the special-shaped screen has a special-shaped region and a regular-shaped region (for example, a normal rectangular display region), when displaying contents, there is insufficient coordination between the special-shaped region and the regular-shaped region, which reduces the user experience.

SUMMARY

Implementations of the present disclosure provide a method for display control and related products.

According to a first aspect of the present disclosure, an electronic device is provided. The electronic device includes a notched screen and the notched screen has a first region and a second region. The electronic device further includes a processor and a memory configured to store executable program codes which, when executed, cause the processor to: acquire device color information near the first region; determine a target color-display adjustment parameter of the first region according to the device color information; control display of the first region according to the target color-display adjustment parameter.

According to a second aspect of the present disclosure, a method for display control is provided. The method for display control is applicable to an electronic device. The electronic device includes a notched screen and a circuit coupled with the notched screen. The notched screen has a first region and a second region. The method includes the following.

Device color information near the first region is acquired. A target color-display adjustment parameter of the first region is determined according to the device color information. Display of the first region is controlled according to the target color-display adjustment parameter.

According to a third aspect of the present disclosure, a non-transitory computer readable storage medium for storing computer programs is provided. The computer programs cause a computer to execute instructions of some or all of the steps/operations as described in the second aspect of the implementations of the present disclosure.

BRIEF DESCRIPTION OF THE DRAWINGS

To illustrate the technical solutions embodied by the implementations of the present disclosure more clearly, the following briefly introduces the accompanying drawings required for describing the implementations. Apparently, the accompanying drawings in the following description merely illustrate some implementations of the present disclosure. Those of ordinary skill in the art may also obtain other drawings based on these accompanying drawings without creative efforts.

DETAILED DESCRIPTION

Figure 1A:
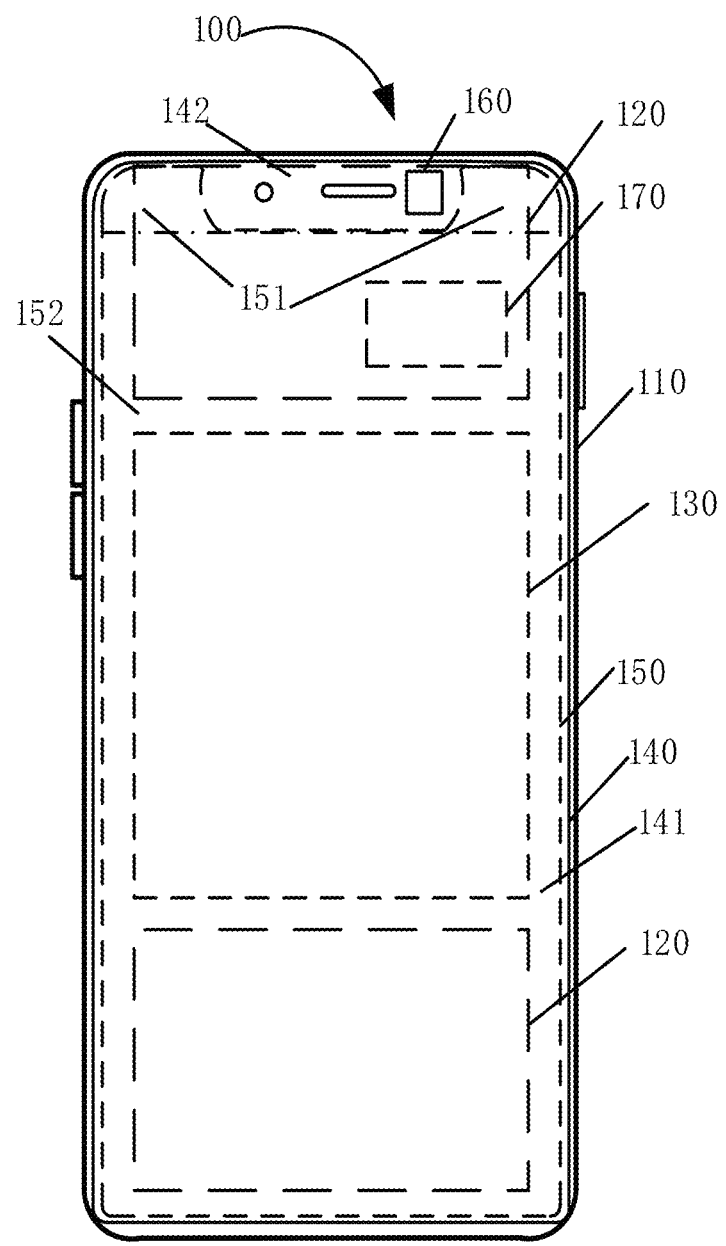
FIG. 1A is a schematic structure diagram illustrating an exemplary electronic device according to implementations of the present disclosure.

Technical solutions in the implementations of the present disclosure will be described clearly and completely hereinafter with reference to the accompanying drawings in the implementations of the present disclosure. Apparently, the described implementations are merely some rather than all implementations of the present disclosure. All other implementations obtained by those of ordinary skill in the art based on the implementations of the present disclosure without creative efforts shall fall within the protection scope of the present disclosure.

The terms such as "first" and "second" used in the specification, the claims, and the accompanying drawings of the present disclosure are used for distinguishing between different objects rather than describing a particular order. The terms "include" and "comprise" as well as variations thereof are intended to cover non-exclusive inclusion. For example, a process, method, system, product, device, or apparatus including a series of steps or units is not limited to the listed steps or units, it can optionally include other steps or units that are not listed; alternatively, other steps or units inherent to the process, method, product, or device can be included either.

The term "embodiment" or "implementation" referred to herein means that a particular feature, structure, or feature described in conjunction with the implementation may be contained in at least one implementation of the present disclosure. The phrase appearing in various places in the specification does not necessarily refer to the same implementation, nor does it refer to an independent or alternative implementation that is mutually exclusive with other implementations. It is expressly and implicitly understood by those skilled in the art that an implementation described herein may be combined with other implementations.

The electronic device involved in the implementations of the present disclosure may include various handheld devices equipped with wireless communication functions, in-vehicle devices, wearable devices, computing devices, or other processing devices connected to the wireless modem, as well as various forms of user equipment (UE), mobile stations (MS), terminal devices, and the like. For the convenience of description, the above-mentioned devices are collectively referred to as an electronic device.

According to a first aspect of the present disclosure, an electronic device is provided. The electronic device includes a notched screen (that is, special-shaped screen) and a circuit coupled with the notched screen. The notched screen has a first region (that is, special-shaped region) and a second region (that is, regular-shaped region).

The circuit is configured to acquire device color information near the first region; determine a target color-display adjustment parameter of the first region according to the device color information. The circuit is further configured to control display of the first region according to the target color-display adjustment parameter.

According to a second aspect of the present disclosure, a method for display control is provided. The method for display control is applicable to an electronic device. The electronic device includes a notched screen and a circuit coupled with the notched screen. The notched screen has a first region and a second region. The method includes the following.

The circuit acquires device color information near the first region. The circuit determines a target color-display adjustment parameter of the first region according to the device color information. The circuit controls display of the first region according to the target color-display adjustment parameter.

According to a third aspect of the present disclosure, a method for display control is provided. The method for display control is applicable to an electronic device. The electronic device includes a notched screen and a circuit coupled with the notched screen. The notched screen has a first region and a second region. The method includes the following.

Device color information near the first region is acquired. A target color-display adjustment parameter of the first region is determined according to the device color information. Display of the first region is controlled according to the target color-display adjustment parameter.

According to a fourth aspect of the present disclosure, a device for display control is provided. The device for display control is applicable to an electronic device. The electronic device includes a notched screen and a circuit coupled with the notched screen. The notched screen has a first region and a second region. The device for display control includes a first acquiring unit, a determining unit, and a controlling unit.

The first acquiring unit is configured to acquire device color information near the first region. The determining unit is configured to determine a target color-display adjustment parameter of the first region according to the device color information. The controlling unit is configured to control display of the first region according to the target color-display adjustment parameter.

According to a fifth aspect of the present disclosure, an electronic device is provided. The electronic device includes a notched screen and the notched screen has a first region and a second region. The electronic device further includes a processor and a memory configured to store executable program codes, which, when executed, cause the processor to: acquire device color information near the first region; determine a target color-display adjustment parameter of the first region according to the device color information; control display of the first region according to the target color-display adjustment parameter.

As an implementation, the target color-display adjustment parameter includes at least one of: color temperature, a component ratio of color component, a frequency band of the color component, and an average luminance of the color component; and the color component includes at least one of: red, blue, and green.

As an implementation, the executable program codes causing the processor to determine the target color-display adjustment parameter of the first region according to the device color information cause the processor to: determine the target color-display adjustment parameter of the first region according to a correspondence between preset device color information and color-display adjustment parameters, the target color-display adjustment parameter including a background-color adjustment parameter and a content-color adjustment parameter.

As an implementation, the executable program codes further cause the processor to: acquire ambient light color information.

The executable program codes causing the processor to determine the target color-display adjustment parameter of the first region according to the device color information cause the processor to determine the target color-display adjustment parameter of the first region according to the device color information and the ambient light color information.

As an implementation, the executable program codes causing the processor to determine the target color-display adjustment parameter of the first region according to the device color information and the ambient light color information cause the processor to: determine the target color-display adjustment parameter according to a correspondence between device color information and ambient light color information, and color-display adjustment parameters.

As an implementation, the executable program codes causing the processor to control display of the first region according to the target color-display adjustment parameter cause the processor to: determine a content to be displayed in the first region; acquire preset color information corresponding to the content to be displayed; obtain target color information, by adjusting the preset color information according to the target color-display adjustment parameter; display in the first region the content to be displayed according to the target color information (in other words, display the target color information in the first region).

As an implementation, the executable program codes causing the processor to determine the content to be displayed in the first region cause the processor to determine an application running in the foreground; determine a current interface of the application; determine a content of the current interface displayed in the first region as the content to be displayed.

As an implementation, the executable program codes causing the processor determine the content to be displayed in the first region cause the processor to: determine an application running in the foreground; determine a current interface of the application; determine a next interface of the current interface; determine a content of the next interface displayed in the first region as the content to be displayed.

As an implementation, the executable program codes further cause the processor to: acquire a display region of a content to be displayed; acquire the device color information near the first region, when the display region includes the first region.

According to a sixth aspect of the present disclosure, a non-transitory computer readable storage medium for storing computer programs is provided. The computer programs cause a computer to execute instructions of some or all of the steps/operations as described in the third aspect of the implementations of the present disclosure.

According to a seventh aspect of the present disclosure, a computer program product is provided. The computer program product includes a non-transitory computer readable storage medium storing computer programs. The computer programs are operable to cause a computer to perform some or all of steps/operations as described in the third aspect of the implementations of the present disclosure. The computer program product may be a software installation package.

The implementations of the present disclosure have the following advantageous effects.

As can be seen, the method for display control and the related products provided herein are applicable to an electronic device. The electronic device includes a notched screen and a circuit coupled with the notched screen. The notched screen has a first region and a second region. As for the method, device color information near the first region is acquired, and then a target color-display adjustment parameter of the first region is determined according to the device color information. Thereafter, display of the first region is controlled according to the target color-display adjustment parameter. In this way, the color of the first region can be adjusted according to the device color information near the first region, which can improve the display coordination between the first region and the second region when the notched screen displays contents, thereby improving the user experience.

The following implementations of the present disclosure will be described in detail.

FIG. 1A is a schematic structure diagram illustrating an electronic device 100 according to implementations of the present disclosure. The above-mentioned electronic device 100 includes a housing 110, a circuit board 120, a battery 130, and a cover plate 140. The circuit board 120, the battery 130, and the cover plate 140 are disposed on the housing 110. The cover plate 140 has a region A 141 and a region B 142 other than the region B 141. An inner surface of the region A 141 is provided with a notched screen 150. The notched screen 150 has a first region 151 and a second region 152. The circuit board 120 is provided with a circuit 170 coupled with the notched screen 150.

The circuit 170 may include a processor and a memory. The processor is a control center of the electronic device and is configured to connect various parts of the whole electronic device through various interfaces and lines, to run or execute software programs and/or modules stored in the memory, and to invoke data stored in the memory to perform various functions of the electronic device and process data, thereby monitoring the electronic device as a whole. In at least one implementation, the processor integrates an application processor and a modem processor. The application processor is mainly configured to handle an operating system, a user interface, applications, and so on. The modem processor is mainly configured to handle wireless communication. It should be understood that the above-mentioned modem processor may also not be integrated into the processor.

The memory is configured to store software programs and modules, and the processor is configured to execute various function applications and data processing of the electronic device by running the software programs and modules stored in the memory. The memory may include a program storage region and a data storage region. The program storage region may store an operating system, application programs required for at least one function, and so on. The data storage region may store data created according to use of the electronic device, and so on. In addition, the memory may include a high-speed random access memory (RAM), and may further include a non-volatile memory such as at least one disk storage device, a flash device, or other non-volatile solid storage devices.

In one implementation, the region B 142 includes a single plate region (that is, in one implementation, there can be only one region B 142), and the single plate region may partially overlap a side edge of the cover plate 140.

In one implementation, at least one function assembly 160 is disposed at a position on the circuit board 120 corresponding to the region B 142, and the circuit 170 may be coupled with the at least one functional assembly 160.

In addition, the at least one functional assembly 160 includes at least one of a front camera, a face recognition device, a proximity sensor, an ambient light sensor, etc.

In one implementation, the notched screen 150 includes a touch screen and a display screen, and the display screen may include an organic light-emitting diode (OLED) display screen.

Figure 1B:
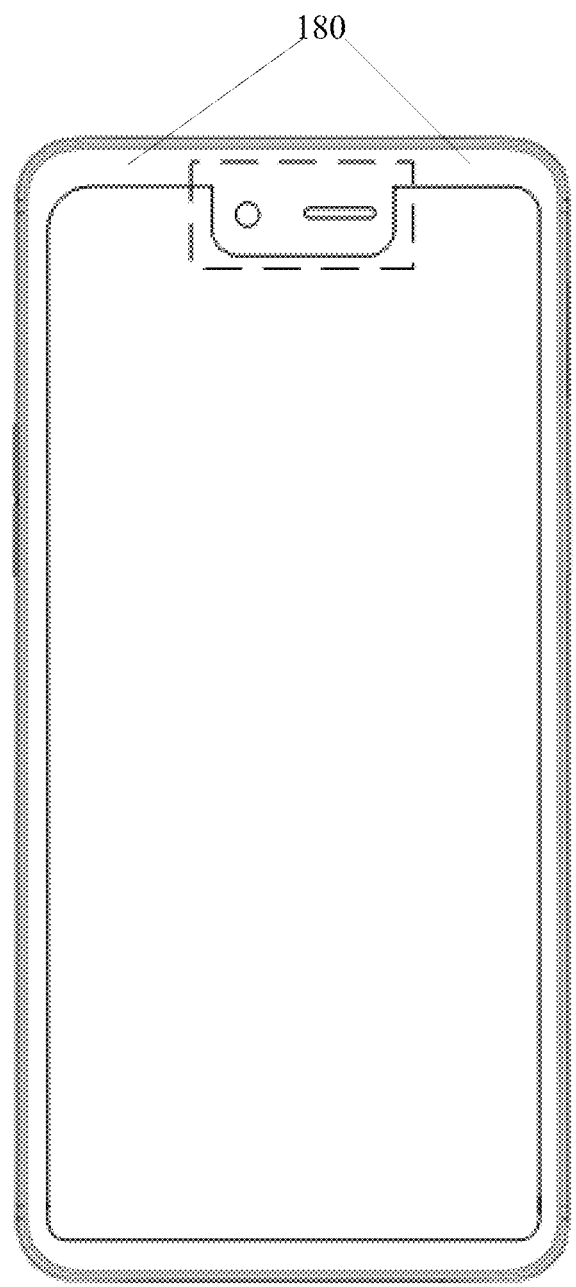
FIG. 1B is a schematic presentation diagram illustrating an electronic device according to implementations of the present disclosure.

Further, as illustrated in FIG. 1B, contents are unable to be displayed in a region disposed on an upper end of the notched screen, that is, an incomplete region corresponding to the notched screen (represented by a region in a dashed box in FIG. 1B, and corresponding to the region B 142 in FIG. 1A). Since the incomplete region is configured to accommodate some sensors (such as a camera(s), a microphone, etc.), the incomplete region does not belong to a display region of the notched screen and is unable for display. Therefore, a notched display screen is presented.

Figure 1C:
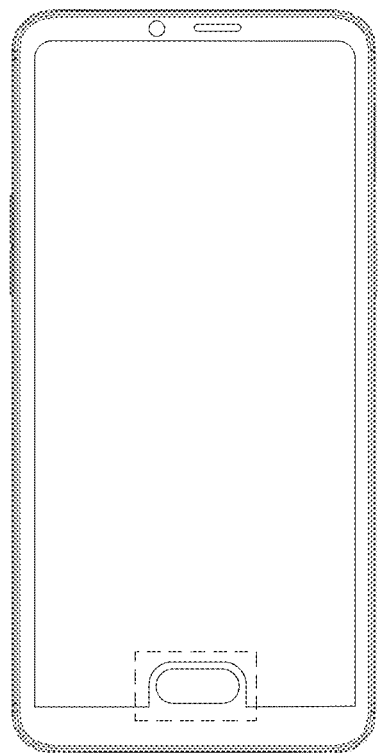
FIG. 1C is a schematic presentation diagram illustrating an electronic device according to implementations of the present disclosure.

Furthermore, FIG. 1C illustrates a variation structure of the electronic device 100 illustrated in FIG. 1A, which further includes a home key (i.e., a key in a dashed box in FIG. 1C). Therefore, the notched screen in FIG. 1C is also presented as a notched display screen. It can be seen that, some regions disposed on a lower end of the notched screen, that is, an incomplete region in the notched screen, is unable to display contents. Since the incomplete region is configured to accommodate some sensors (such as the above-mentioned home key), the incomplete region does not belong to a display region of the notched screen and is unable to be used for display, and, a notched display screen is presented.

Of course, the incomplete region corresponding to the notched screen can be disposed not only on upper or lower ends thereof, but also on left or right sides thereof, or even be disposed at a corner thereof. In addition, the incomplete region may also be embodied as multiple regions. The incomplete region corresponds to the notched screen, and the incomplete region is unable to be used to display contents due to some sensors are disposed therein. Therefore, when conducting display control on the notched screen, a display control image in a special shape will be obtained. Thus, this does not conform to the conventional aesthetics and moreover, since the incomplete region is unable to display contents, this causes corresponding contents that should be originally displayed to be missing, resulting in incomplete content display and degrading user experience.

The electronic device described based on FIGS. 1A to 1C can be used to implement the following functions.

The circuit 170 is configured to acquire device color information near the first region, and to determine a target color-display adjustment parameter of the first region according to the device color information.

The circuit 170 is further configured to control display of the first region according to the target color-display adjustment parameter.

The notched screen 150 has the first region 151 and the second region 152, and the first region 151 and the second region 152 have the same function. The notched screen 150 may be a touch display screen, in this regard, the notched screen 150 may be configured to receive touch operations and to display contents.

As can be seen, the electronic device includes the housing, the circuit board, the battery, and the cover plate. The circuit board, the battery, and the cover plate are accommodated in the housing. The cover plate has the region A and the region B other than the region A. The inner surface of the region A is provided with the notched screen, the notched screen has the first region and the second region, and the circuit board is provided with a circuit coupled with the notched screen. Device color information near the first region is acquired, and then target color-display adjustment parameter of the first region is determined according to the device color information. Thereafter, display of the first region is controlled according to the target color-display adjustment parameter. In this way, the color of the first region can be adjusted according to the device color information near the first region, which can improve the display coordination between the first region and the second region when the notched screen displays contents, thereby improving the user experience.

In an implementation, the circuit 170 configured to determine the target color-display adjustment parameter of the first region according to the device color information is further configured to determine the target color-display adjustment parameter of the first region according to a correspondence between preset device color information and color-display adjustment parameters. The target color-display adjustment parameter includes a background-color adjustment parameter and a content-color adjustment parameter.

In an implementation, the ambient light sensor 160 (in this implementation, the functional assembly can be embodied as the ambient light sensor) is configured to acquire ambient light color information.

The circuit 170 configured to determine the target color-display adjustment parameter of the first region according to the device color information is further configured to determine the target color-display adjustment parameter of the first region according to the device color information and the ambient light color information.

In an implementation, the circuit 170 configured to control display of the first region according to the target color-display adjustment parameter is further configured to: determine a content(s) to be displayed in the first region; acquire preset color information corresponding to the content to be displayed; obtain target color information, by adjusting the preset color information according to the target color-display adjustment parameter; control the notched screen 150 display in the first region the content to be displayed according to the target color information.

In an implementation, the circuit 170 is further configured to acquire a display region of a content to be displayed and to acquire the device color information near the first region, when the display region includes the first region.

The electronic device described based on FIGS. 1A to 1C can be used to implement the following method for display control.

The circuit 170 acquires device color information near the first region.

The circuit 170 determines a target color-display adjustment parameter of the first region according to the device color information.

The circuit 170 controls display of the first region according to the target color-display adjustment parameter.

Based on the electronic device illustrated in FIGS. 1A to 1C, FIG. 1D is a flow chart illustrating a method for display control according to implementations of the present disclosure. The method for display control illustrated in the implementations of the present disclosure is applicable to an electronic device including a notched screen. The notched screen includes a first region and a regular region. The method for display control begins at block 101.

At block 101, device color information near the first region is acquired.

The device color information can refer to the housing color of the device (in other words, device color near the edge of the first region), for example, white, black, green, pink, gray, gold, and the like. In some implementation, the housing color is set in advance, which is mainly determined by the model of the electronic device. In some implementation, the housing color can change according to the change of ambient light. It can be seen from the above that the electronic device in the implementations of the present disclosures is provided with a notched screen, and the notched screen includes a first region. The edge of the first region can be determined (for example, the edge of the first region can refer to regions 180 illustrated in FIG. 1B) and then device color information near the edge of the first region can be acquired.

At block 102, a target color-display adjustment parameter of the first region is determined according to the device color information.

As for different device color information, the display effect of the notched screen that the user pays attention to is different. For example, when the device color information indicates that the electronic device is a black model, the first region can display white characters in a black background or can display black characters in a white background. In these two conditions, the display effect of the notched screen that the user pays attention to is different. Therefore, different color-display adjustment parameters can be determined according to different device color information in the implementations of the present disclosure. The target color-display adjustment parameter is configured to parameter(s) based on which the first region is adjusted. The target color-display adjustment parameter includes at least one of: color temperature, a component ratio of color component, a frequency band of the color component, and an average luminance of the color component. The color component includes at least one of: red, blue, and green. For example, the target color-display adjustment parameter can include at least one of the following: color temperature, a component ratio of red component, a frequency band of the red component, an average luminance of the red component, a component ratio of blue component, a frequency band of the blue component, an average luminance of the blue component, a component ratio of green component, a frequency band of the green component, an average luminance of the green component, and the like.

In an implementation, in the above operations at block 102, the target color-display adjustment parameter of the first region is determined according to the device color information as follows.

The target color-display adjustment parameter of the first region is determined according to a correspondence between preset device color information and color-display adjustment parameters. The target color-display adjustment parameter includes a background-color adjustment parameter and a content-color adjustment parameter.

The electronic device can store the correspondence between device color information and color-display adjustment parameters in advance, and the correspondence can be set before the electronic device is shipped from the factory. The target color-display adjustment parameter can include the background-color adjustment parameter and the content-color adjustment parameter. The background-color adjustment parameter can include at least one of the following: color, luminance, color temperature, component ratio of each color, frequency band of each color, and the like. The content-color adjustment parameter can include at least one of the following: color, luminance, color temperature, component ratio of each color, frequency band of each color, and the like. The background can be one of the following: wallpaper, an interface background of a third-party application, and the like. The content can be at least one of the following: a picture(s), a widget(s), a character(s), and the like. For example, the color of the background is white with the color of the content being black.

The method can further include the following between operations at block 101 and operations at block 102.

Ambient light color information is acquired.

As for operations at block 102, the target color-display adjustment parameter of the first region can be determined according to the device color information as follows.

The target color-display adjustment parameter of the first region is determined according to the device color information and the ambient light color information.

The ambient light color information can be acquired by an ambient light sensor. The ambient light color information can include at least one of the following: luminance of ambient light, color temperature of the ambient light, color component of the ambient light, and the like. The electronic device can set a correspondence between device color information and ambient light color information, and color-display adjustment parameters in advance, and determine the target color-display adjustment parameter of the first region according to the correspondence. In an implementation, the device color information is a constant which is a known quantity before the electronic device is shipped from the factory. The ambient light color information is a variable. The correspondence between device color information and ambient light color information, and color-display adjustment parameters can be obtained via a large number of experiments in different light environments.

At block 103, display of the first region is controlled according to the target color-display adjustment parameter.

The first region is a part of the notched screen, so only display of a partial region of the first region can be controlled through operations at block 103. In an implementation, display of the first region is controlled according to the target color-display adjustment parameter, and contents to be displayed are displayed in the first region. In this way, the difference of display effect between the first region and the second region is weakened, thereby the first region drawing less attention from the user.

For example, for a notched screen, the notched screen has a first region and a second region. If the electronic device is a black model, the first region can display white characters in a black background; if the electronic device is a white model, the first region can display black characters in a white background; the second region can display contents normally in a regular way. In this way, the display coordination between the first region and the second region when the notched screen displays contents can be improved, thereby improving the user experience.

As for operations at block 103, display of the first region can be controlled according to the target color-display adjustment parameter as follows.

A content (s) to be displayed in the first region is determined. Preset color information corresponding to the content to be displayed is acquired. Target color information is obtained by adjusting the preset color information according to the target color-display adjustment parameter. The content to be displayed is displayed in the first region according to the target color information. In other words, the target color information can be displayed in the first region.

The electronic device can determine the content to be displayed in the first region. In an implementation, the electronic device first determines an application running in the foreground, a current interface of the application, and a next interface of the current interface. A content(s) of the current interface displayed in the first region or a content(s) of the next interface displayed in the first region is determined as the content to be displayed. Then the preset color information corresponding to the content to be displayed is determined. It is the preset color information because the interface is set in advance and color information corresponding to the interface is also set in advance. Thereafter, the preset color information is adjusted according to the target color-display adjustment parameter to obtain the target color information, and the content to be displayed is displayed according to the target color information in the first region. In this way, as for different display contents, the difference of display effect between the first region and the second region can be weakened, and the user can watch the notched screen more comfortably and pay less attention to the special-shaped effect. The content to be displayed may be at least one of the following: a desktop, wallpaper, a photo, a widget, and the like.

As can be seen, the method for display control provided herein is applicable to an electronic device. The electronic device includes a notched screen and a circuit coupled with the notched screen. The notched screen has a first region and a second region. Device color information near the first region is acquired, and then target color-display adjustment parameter of the first region is determined according to the device color information. Thereafter, display of the first region is controlled according to the target color-display adjustment parameter. In this way, the color of the first region can be adjusted according to the device color information near the first region, which can improve the display coordination between the first region and the second region when the notched screen displays contents, thereby improving the user experience.

Figure 2:
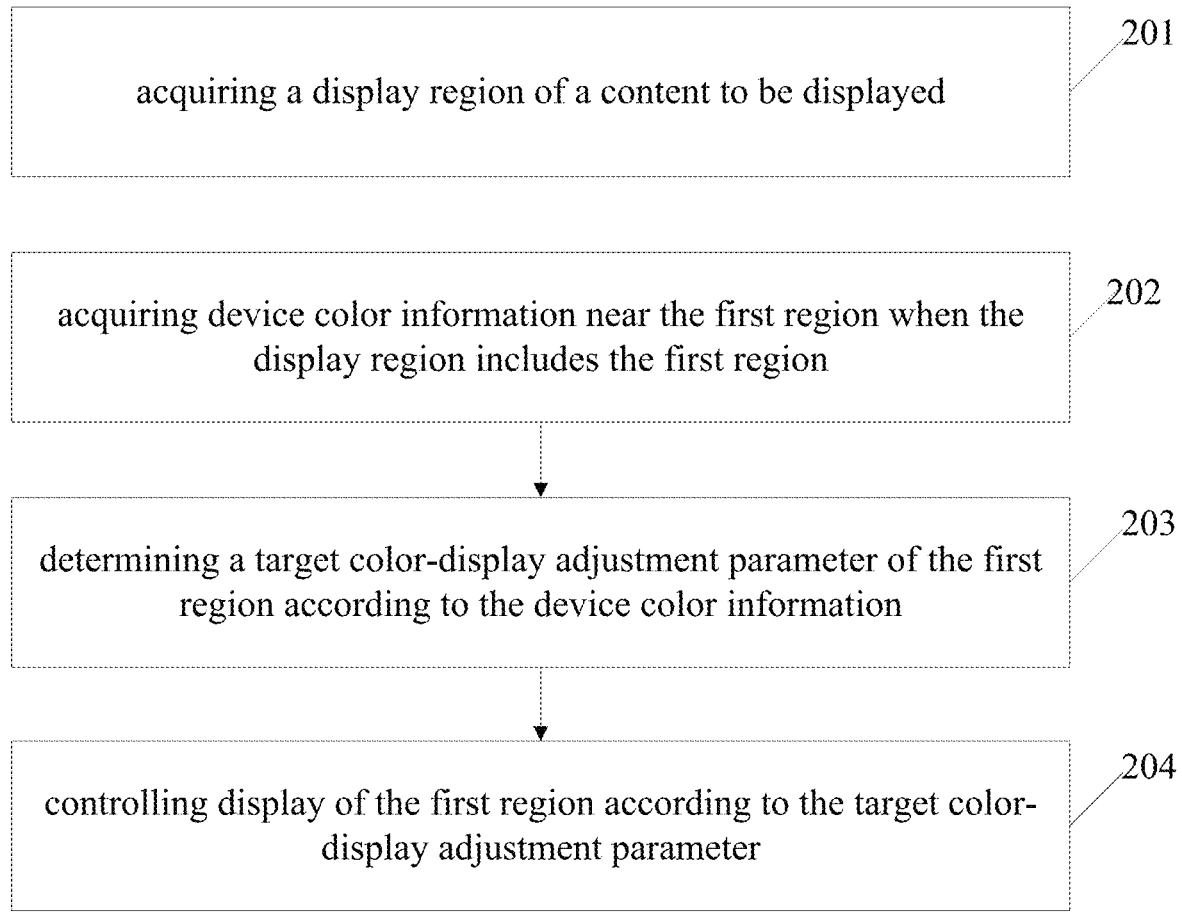
FIG. 2 is another flow chart illustrating a method for display control according to implementations of the present disclosure.

Accordingly, FIG. 2 is a flow chart illustrating a method for display control according to implementations of the present disclosure. The method for display control illustrated in the implementations of the present disclosure may include the following.

At block 201, a display region of a content to be displayed is acquired.

The content to be displayed can be a display content of a next interface of a current interface, or a display content of a current loading interface. Of course, the display region of the content to be displayed can include the special-shape region, or may not include the special-shape region.

At block 202, device color information near the first region is acquired when the display region includes the first region.

When the display region includes the first region, the electronic device can acquire the device color information near the first region. When the display region does not include the first region, the following steps cannot be performed. In an implementation, when the first region displays contents, the method for display control provided in the implementations of the present disclosure is conducted. When the first region dose not display contents, the method for display control provided in the implementations of the present disclosure is not conducted, thus reducing the power consumption of the electronic device.

At block 203, a target color-display adjustment parameter of the first region is determined according to the device color information.

At block 204, display of the first region is controlled according to the target color-display adjustment parameter.

The above-identified operations at blocks 202 to 204 may be described with reference to corresponding operations of the method for display control illustrated in FIG. 1D, which are not described herein again.

As can be seen, the method for display control provided herein is applicable to an electronic device. The electronic device includes a notched screen and a circuit coupled with the notched screen. The notched screen has a first region and a second region. Device color information near the first region is acquired, and then target color-display adjustment parameter of the first region is determined according to the device color information. Thereafter, display of the first region is controlled according to the target color-display adjustment parameter. In this way, the color of the first region can be adjusted according to the device color information near the first region, which can improve the display coordination between the first region and the second region when the notched screen displays contents, thereby improving the user experience.

Figure 3:
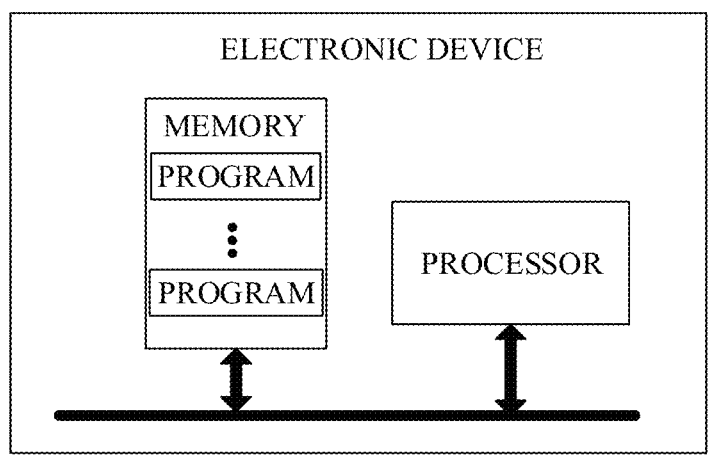
FIG. 3 is another schematic structure diagram illustrating an electronic device according to implementations of the present disclosure.

Accordingly, FIG. 3 is a schematic structure diagram illustrating an electronic device according to implementations of the present disclosure. The electronic device includes a processor, a memory, and one or more programs stored in the memory. The one or more programs are configured to be executed by the processor, and include instructions operable to execute the following operations.

Device color information near the first region is acquired. A target color-display adjustment parameter of the first region is determined according to the device color information. Display of the first region is controlled according to the target color-display adjustment parameter.

In an implementation, in terms of determining a target color-display adjustment parameter of the first region according to the device color information, the one or more programs include instructions operable to execute the following operations.

The target color-display adjustment parameter of the first region is determined according to a correspondence between preset device color information and color-display adjustment parameters. The target color-display adjustment parameter includes a background-color adjustment parameter and a content-color adjustment parameter.

In an implementation, the one or more programs further include instructions operable to execute the following operations.

Ambient light color information is acquired.

In terms of determining a target color-display adjustment parameter of the first region according to the device color information, the one or more programs include instructions operable to execute the following operations.

The target color-display adjustment parameter of the first region is determined according to the device color information and the ambient light color information.

In an implementation, in terms of controlling display of the first region according to the target color-display adjustment parameter, the one or more programs include instructions operable to execute the following operations.

A content to be displayed in the first region is determined. Preset color information corresponding to the content to be displayed is acquired. Target color information is obtained by adjusting the preset color information according to the target color-display adjustment parameter. The content to be displayed is displayed in the first region according to the target color information.

In an implementation, the one or more programs further include instructions operable to execute the following operations.

A display region of a content to be displayed is acquired. Device color information near the first region is acquired when the display region includes the first region.

A device for implementing the above-mentioned method for display control is provided as follows.

Figure 4A:
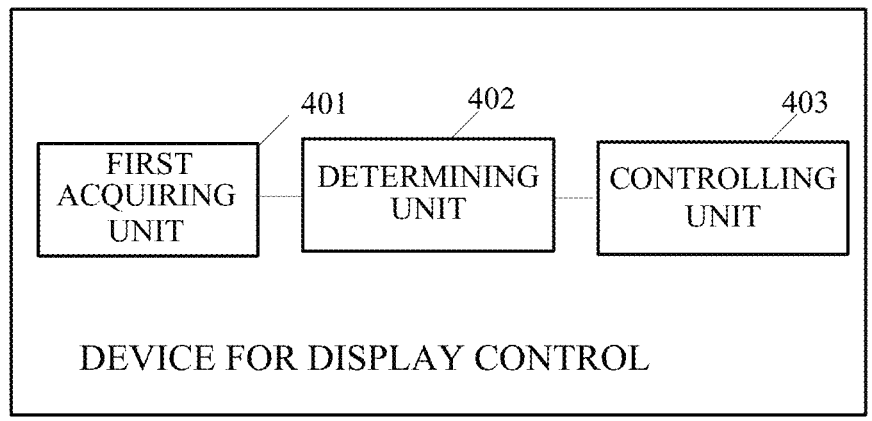
FIG. 4A is a schematic structure diagram illustrating a device for display control according to implementations of the present disclosure.

FIG. 4A is a schematic structure diagram illustrating a device for display control according to implementations of the present disclosure. The device for display control is applicable to an electronic device. The electronic device includes a housing, a circuit board, a battery, and a cover plate. The circuit board, the battery, and the cover plate are disposed on the housing. The cover plate has a region A and a region B other than the region A. An inner surface of the region A is provided with a notched screen. The notched screen has a first region and a second region, and the circuit board is provided with a circuit coupled with the notched screen. The device for display control includes a first acquiring unit 401, a determining unit 402, and a controlling unit 403.

The first acquiring unit 401 is configured to acquire device color information near the first region.

The determining unit 402 is configured to determine a target color-display adjustment parameter of the first region according to the device color information.

The controlling unit 403 is configured to control display of the first region according to the target color-display adjustment parameter.

In an implementation, the determining unit 402 is further configured to determine the target color-display adjustment parameter of the first region according to a correspondence between preset device color information and color-display adjustment parameters. The target color-display adjustment parameter includes a background-color adjustment parameter and a content-color adjustment parameter.

Figure 4B:
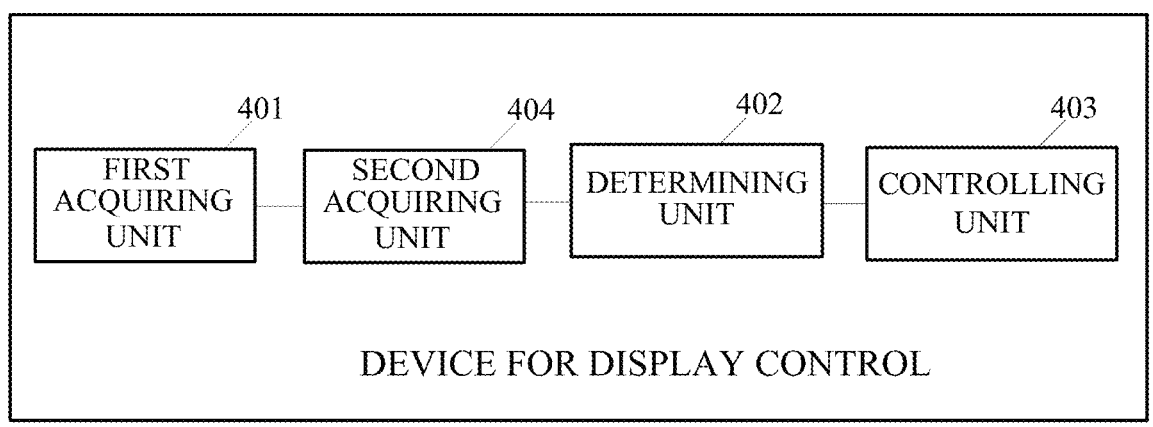
FIG. 4B is another schematic structure diagram illustrating the device for display control illustrated in FIG. 4A according to implementations of the present disclosure.

FIG. 4B illustrates a variant structure of the device for display control illustrated in FIG. 4A. Compared with FIG. 4A, a second acquiring unit 404 can be further provided.

The second acquiring unit 404 is configured to acquire ambient light color information.

The determining unit 402 is further configured to determine the target color-display adjustment parameter of the first region according to the device color information and the ambient light color information.

Figure 4C:
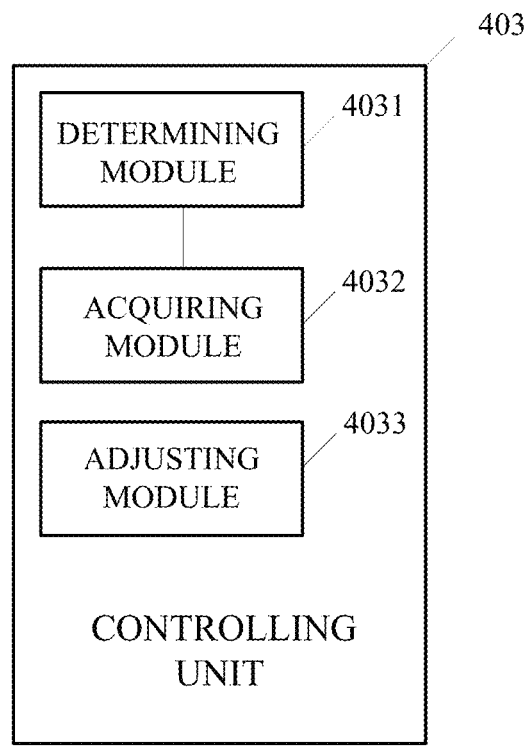
FIG. 4C is a schematic structure diagram illustrating a controlling unit of the device for display control illustrated in FIG. 4A according to implementations of the present disclosure.

FIG. 4C is a schematic detail structure diagram illustrating the controlling unit 403 of the device for display control illustrated in FIG. 4A according to implementations of the present disclosure. The controlling unit 403 may include a determining module 4031, an acquiring module 4032, and an adjusting module 4033.

The determining module 4031 is configured to determine a content to be displayed in the first region The acquiring module 4032 is configured to acquire preset color information corresponding to the content to be displayed.

The adjusting module 4033 is configured to adjust the preset color information according to the target color-display adjustment parameter to obtain target color information and display in the first region the content to be displayed according to the target color information.

Figure 4D:
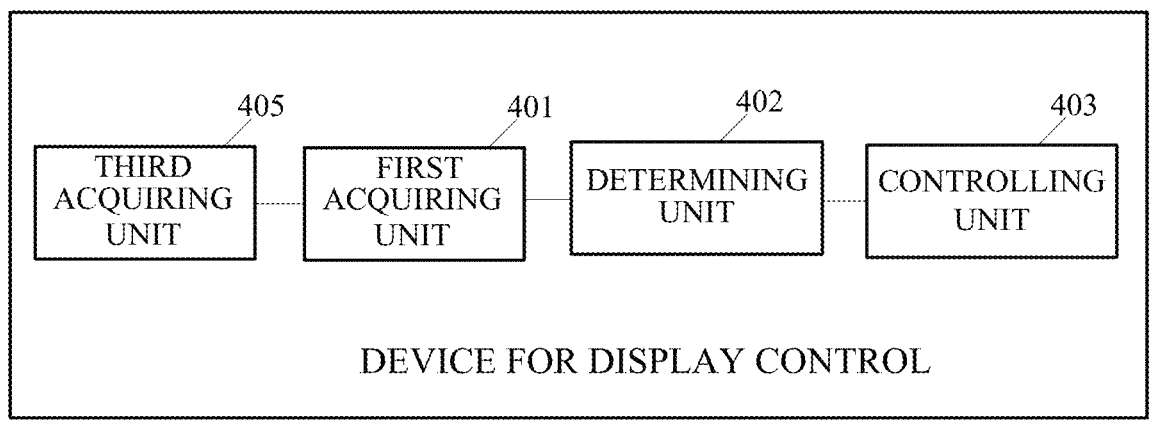
FIG. 4D is another schematic structure diagram illustrating the device for display control illustrated in FIG. 4A according to implementations of the present disclosure.

FIG. 4D illustrates a variant structure of the device for display control illustrated in FIG. 4A. Compared with FIG. 4A, a third acquiring unit 405 can be further provided.

The third acquiring unit 405 is configured to acquire a display region of a content to be displayed.

The first acquiring unit 401 is further configured to acquire the device color information near the first region when the display region includes the first region.

As can be seen, the device for display control provided herein is applicable to an electronic device. The electronic device includes a notched screen and a circuit coupled with the notched screen. The notched screen has a first region and a second region. Device color information near the first region is acquired, and then target color-display adjustment parameter of the first region is determined according to the device color information. Thereafter, display of the first region is controlled according to the target color-display adjustment parameter. In this way, the color of the first region can be adjusted according to the device color information near the first region, which can improve the display coordination between the first region and the second region when the notched screen displays contents, thereby improving the user experience.

It should be understood that the functions of the program modules of the device for display control in this implementation may be specifically implemented according to the method for display control in the foregoing method implementations. For a specific implementation process thereof, reference may be made to the related description of the foregoing method implementations, and details are not described herein again.

In this implementation, the device for display control is presented in the form of units. The "units" herein may refer to an application-specific integrated circuit (ASIC), a processor and a memory that can execute one or more software or firmware programs, an integrated logic circuit, and/or other components that can achieve the above-described functions. In addition, the above-identified units or modules are implemented by the application processor of the electronic device illustrated in FIG. 3.

Figure 5:
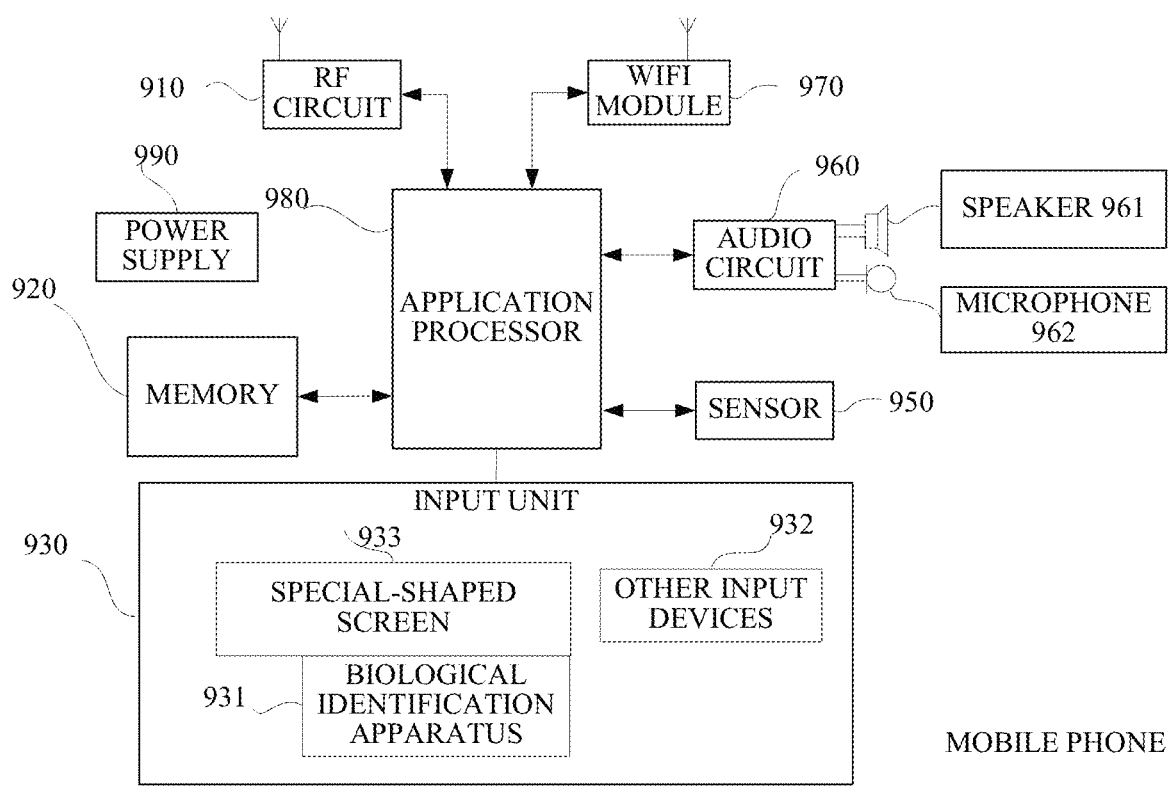
FIG. 5 is a schematic structure diagram illustrating another electronic device according to implementations of the present disclosure.

The implementations of the present disclosure also provide another electronic device, as shown in FIG. 5. For the convenience of description, only parts related to the implementations of the present application are shown. Specific technical details are not disclosed please refer to the method implementations of the present disclosure. The electronic device may be any terminal device such as a mobile phone, a tablet computer, a personal digital assistant (PDA), a point of sales (POS), an in-vehicle computer, and the like. The following describes a mobile phone as an example of the electronic device.

FIG. 5 is a block diagram of a part of a structure of a mobile phone related to an electronic device according to an implementation of the disclosure. Referring to FIG. 5, the mobile phone includes a radio frequency (RF) circuit 910, a memory 920, an input unit 930, a sensor 950, an audio circuit 960, a wireless fidelity (Wi-Fi) module 970, a processor 980, and a power supply 990 and other components. Those skilled in the art can understand that the structure of the mobile phone illustrated in FIG. 5 does not constitute any limitation on a mobile phone. The mobile phone configured to implement technical solutions of the disclosure may include more or fewer components than illustrated, or may combine certain components or different components.

In the following, various components of the mobile phone will be described in detail with reference to FIG. 5.

The input unit 930 may be configured to receive input digital or character information and generate key signal input associated with user setting and function control of the mobile phone. As one implementation, the input unit 930 may include a notched screen 933, a biological identification apparatus 931 and other input devices 932. The notched screen 933 may have a first region and a second region. The biological identification apparatus 931 may refer to the above-mentioned structure, and a specific structure thereof may be composed with reference to the above description, and details are not described herein. The input unit 930 may further include the other input devices 932. As one implementation, the other input devices 932 may include, but is not limit to, one or more of a physical keyboard, a function key (such as a volume control key, a switch key, etc.), a trackball, a mouse, a joystick, and the like.

The processor 980 is configured to perform the following operations. Device color information near the first region is acquired. A target color-display adjustment parameter of the first region is determined according to the device color information. Display of the first region is controlled according to the target color-display adjustment parameter.

The processor 980 is a control center of the mobile phone and connects various parts of the entire mobile phone through various interfaces and lines. By running or executing software programs and/or modules stored in the memory 920 and invoking data stored in the memory 920, the processor 980 can execute various functions of the mobile phone and conduct data processing, so as to monitor the mobile phone as a whole. The processor 980 may include one or more processing units. The processor 980 may be integrated with a processor (such as, a CPU or GPU) and a modem processor, where the processor is mainly configured to handle an operating system, a user interface, applications, and so on, and the modem processor is mainly configured to deal with wireless communication. It will be appreciated that the modem processor mentioned above may not be integrated into the processor 980.

In addition, the memory 920 may include a high-speed RAM, and may further include a non-volatile memory such as at least one disk storage device, a flash device, or other non-volatile solid storage devices.

The RF circuit 910 is configured to receive or transmit information. Generally, the RF circuit 910 includes but is not limited to an antenna, at least one amplifier, a transceiver, a coupler, a low noise amplifier (LNA), a duplexer, and the like. In addition, the RF circuit 910 may also communicate with other devices via wireless communication and the network. The above wireless communication may use any communication standard or protocol, which includes but is not limited to global system of mobile communication (GSM), general packet radio service (GPRS), code division multiple access (CDMA), wideband code division multiple access (WCDMA), long term evolution (LTE), E-mail, short messaging service (SMS), and so on.

The mobile phone may also include at least one sensor 950, such as a light sensor, a motion sensor, and other sensors. As one implementation, the light sensor includes an ambient light sensor and a proximity sensor, among which the ambient light sensor can adjust brightness of the notched screen 933 according to ambient lights, and the proximity sensor can turn off the notched screen 933 and/or backlight when the mobile phone reaches nearby the ear. As a kind of the motion sensor, a accelerometer sensor can detect the magnitude of acceleration in all directions (typically three axes) and when the mobile phone is stationary, the accelerometer sensor can detect the magnitude and direction of gravity; the accelerometer sensor can also identify mobile-phone gestures related the applications (such as vertical and horizontal screen switch, related games, magnetometer attitude calibration), or the accelerometer sensor can be used for vibration-recognition related functions (such as a pedometer, percussion), and so on. The mobile phone can also be equipped with a gyroscope, a barometer, a hygrometer, a thermometer, and an infrared sensor and other sensors, and it will not be repeated herein.

The audio circuit 960, a speaker 961, a microphone 962 may provide an audio interface between the user and the mobile phone. The audio circuit 960 may convert the received audio data into electrical signals and transfer the electrical signals to the speaker 961; thereafter the speaker 961 converts the electrical signals into sound signals to output. On the other hand, the microphone 962 converts the received sound signals into electrical signals, which will be received and converted into audio data by the audio circuit 960 to output. The audio data is then processed by the processor 980, and transmitted by the processor 980 via the RF circuit 910 to another mobile phone for example, or, the audio data is output to the memory 920 for further processing.

Wi-Fi belongs to a short-range wireless transmission technology. With aid of the Wi-Fi module 970, the mobile phone may assist the user in E-mail receiving and sending, webpage browsing, accessing to streaming media and the like. Wi-Fi provides users with wireless broadband Internet access. Although the Wi-Fi module 970 is illustrated in FIG. 5, it should be understood that the Wi-Fi module 970 is not essential to the mobile phone and can be omitted according to actual needs without departing from the essential nature of the present disclosure.

The mobile phone also includes a power supply 990 (e.g., a battery) that supplies power to various components. For instance, the power supply 990 may be logically connected to the processor 980 via a power management system to enable management of charging, discharging, and power consumption through the power management system.

Although not illustrated, the mobile phone may further include a camera, a Bluetooth module, etc., and the disclosure will not elaborate herein.

Figure 1D:
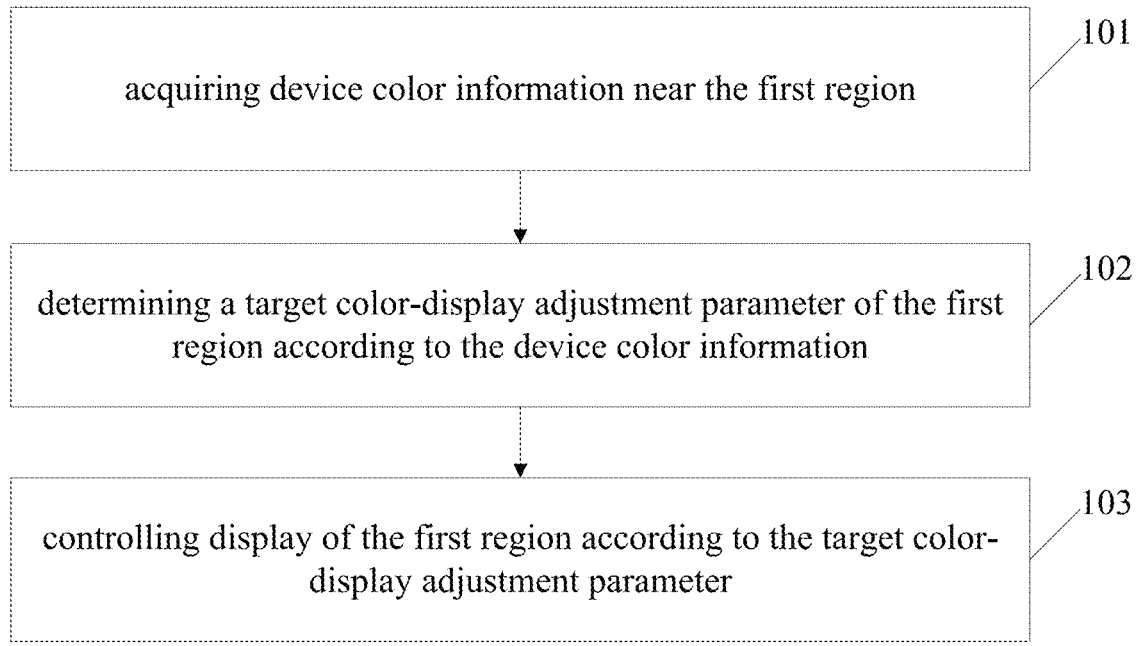
FIG. 1D is a flow chart illustrating a method for display control according to implementations of the present disclosure.

In the implementations illustrated in the foregoing FIG. 1D or FIG. 2, each operation in the method flow may be implemented based on the structure of the mobile phone.

In the implementations illustrated in the foregoing FIG. 3 and FIGS. 4A to 4E, functions of each unit may be implemented based on the structure of the mobile phone.

Implementations of the present disclosure also provide a non-transitory computer storage medium. The non-transitory computer storage medium stores computer programs for electronic data interchange which, when executed, are operable with a computer to accomplish all or part of the operations of any of the methods described in the above-described method implementation.

Implementations of the present disclosure also provide a computer program product. The computer program product includes a non-transitory computer-readable storage medium storing computer programs. The computer programs are operable with a computer to perform all or part of the operations of any of the method for display controls described in the above method implementations.

It is to be noted that, for the sake of simplicity, the foregoing method implementations are described as a series of action combinations. However, it will be appreciated by those skilled in the art that the present disclosure is not limited by the sequence of actions described. According to the present disclosure, certain steps or operations may be performed in other order or simultaneously. Besides, it will be appreciated by those skilled in the art that the implementations described in the specification are exemplary implementations and the actions and modules involved are not necessarily essential to the present disclosure.

In the foregoing implementations, the description of each implementation has its own emphasis. For the parts not described in detail in one implementation, reference may be made to related descriptions in other implementations.

In the implementations of the disclosure, it should be understood that, the device/apparatus disclosed in implementations provided herein may be implemented in other manners. For example, the device/apparatus implementations described above are merely illustrative; for instance, the division of the unit is only a logical function division and there can be other manners of division during actual implementations; for example, multiple units or components may be combined or may be integrated into another system, or some features may be ignored, omitted, or not performed. In addition, coupling or communication connection between each illustrated or discussed component may be direct coupling or communication connection, or may be indirect coupling or communication among devices or units via some interfaces, and may be electrical connection, or other forms of connection.

The units described as separate components may or may not be physically separated, and the components illustrated as units may or may not be physical units, that is, they may be in the same place or may be distributed to multiple network elements. All or part of the units may be selected according to actual needs to achieve the purpose of the technical solutions of the implementations.

In addition, the functional units in various implementations of the present disclosure may be integrated into one processing unit, or each unit may be physically present, or two or more units may be integrated into one unit. The above-mentioned integrated unit can be implemented in the form of hardware or a software function unit.

The integrated unit may be stored in a computer-readable memory when it is implemented in the form of a software functional unit and is sold or used as a separate product. Based on such understanding, the technical solutions of the present disclosure essentially, or the part of the technical solutions that contributes to the related art, or all or part of the technical solutions, may be embodied in the form of a software product which is stored in a memory and includes instructions for causing a computer device (which may be a personal computer, a server, or a network device and so on) to perform all or part of the steps described in the various implementations of the present disclosure. The memory includes various medium capable of storing program codes, such as a USB (universal serial bus) flash disk, a read-only memory (ROM), a random access memory (RAM), a removable hard disk, Disk, compact disc (CD), or the like.

It will be understood by those of ordinary skill in the art that all or a part of the various methods of the implementations described above may be accomplished by means of a program to instruct associated hardware. The program may be stored in a computer-readable memory, which may include a flash memory, a ROM, a RAM, a disk or a CD, and so on.

The implementations of the present disclosure are described in detail above, and specific examples are used herein to describe the principle and implementation manners of the present disclosure. The description of the above implementations is merely used to help understand the method and the core idea of the present disclosure. Meanwhile, those skilled in the art may make modifications to the specific implementation manners and the application scope according to the idea of the present disclosure. In summary, the contents of the specification should not be construed as limiting the present disclosure.

What is claimed is:

1. An electronic device, comprising a notched screen, the notched screen having a first region and a second region, the electronic device further comprising:
   a processor; and
   a memory configured to store executable program codes which, when executed, cause the processor to:
      acquire device color information near the first region, and to determine a target color-display adjustment parameter of the first region according to the device color information, the device color information comprising a correspondence between preset device color information and color-display adjustment parameters, and the target color-display adjustment parameter comprising a background-color adjustment parameter and a content-color adjustment parameter; and
      control display of the first region according to the target color-display adjustment parameter.

2. The electronic device of claim 1, wherein
   the target color-display adjustment parameter comprises at least one of: color temperature, a component ratio of color component, a frequency band of the color component, and an average luminance of the color component; and
   the color component comprises at least one of: red, blue, and green.

3. The electronic device of claim 1, wherein the executable program codes causing the processor to control display of the first region according to the target color-display adjustment parameter cause the processor to:
   determine a content to be displayed in the first region;
   acquire preset color information corresponding to the content to be displayed;
   obtain target color information, by adjusting the preset color information according to the target color-display adjustment parameter; and
   control the notched screen in the first region the content to be displayed according to the target color information.

4. The electronic device of claim 3, wherein the executable program codes causing the processor to determine the content to be displayed in the first region cause the processor to:
   determine an application running in the foreground;
   determine a current interface of the application; and
   determine a content of the current interface displayed in the first region as the content to be displayed.

5. The electronic device of claim 3, wherein the executable program codes causing the processor to determine the content to be displayed in the first region cause the processor to:
   determine an application running in foreground;
   determine a current interface of the application;
   determine a next interface of the current interface; and
   determine a content of the next interface displayed in the first region as the content to be displayed.

6. The electronic device of claim 1, wherein the executable program codes further cause the processor to:
   acquire a display region of a content to be displayed; and
   acquire the device color information near the first region, when the display region comprises the first region.

7. A method for display control, applicable to an electronic device comprising a notched screen and a circuit coupled with the notched screen, the notched screen having a first region and a second region, the method comprising:
   acquiring device color information near the first region;
   acquiring ambient light color information;
   determining a target color-display adjustment parameter of the first region according to the device color information and the ambient light color information; and
   controlling display of the first region according to the target color-display adjustment parameter.

8. The method of claim 7, wherein
   the target color-display adjustment parameter comprises at least one of: color temperature, a component ratio of color component, a frequency band of the color component, and an average luminance of the color component; and
   the color component comprises at least one of: red, blue, and green.

9. The method of claim 7, wherein determining the target color-display adjustment parameter of the first region according to the device color information and the ambient light color information comprises:
   determining the target color-display adjustment parameter according to a correspondence between the device color information and the ambient light color information, and color-display adjustment parameters.

10. The method of claim 7, wherein controlling the display of the first region according to the target color-display adjustment parameter comprises:
   determining a content to be displayed in the first region;
   acquiring preset color information corresponding to the content to be displayed;
   obtaining target color information, by adjusting the preset color information according to the target color-display adjustment parameter; and displaying in the first region the content to be displayed according to the target color information.

11. The method of claim 10, wherein determining the content to be displayed in the first region comprises:
determining an application running in the foreground;
determining a current interface of the application; and
determining a content of the current interface displayed in the first region as the content to be displayed.

12. The method of claim 10, wherein determining the content to be displayed in the first region comprises:
determining an application running in the foreground;
determining a current interface of the application;
determining a next interface of the current interface; and
determining a content of the next interface displayed in the first region as the content to be displayed.

13. The method of claim 7, further comprising:
acquiring a display region of a content to be displayed; and
acquiring the device color information near the first region, when the display region comprises the first region.

14. A non-transitory computer readable storage medium for storing a computer program which, when executed by a processor, causes the processor to carry out actions:
acquiring device color information near a first region, and determining a target color-display adjustment parameter of the first region according to the device color information; and
controlling display of the first region according to the target color-display adjustment parameter;
wherein the computer program executed by the processor to determine the target color-display adjustment parameter of the first region according to the device color information is executed by the processor to:
determine the target color-display adjustment parameter of the first region according to a correspondence between preset device color information and color-display adjustment parameters, the target color-display adjustment parameter comprising a background-color adjustment parameter and a content-color adjustment parameter.

* * * * *